(12) United States Patent
Suda

(10) Patent No.: US 6,707,982 B2
(45) Date of Patent: *Mar. 16, 2004

(54) IMAGE RECORDING APPARATUS HAVING COMPUTER READABLE RECORDING MEDIUM FOR RECORDING IMAGE DATA

(75) Inventor: Hirofumi Suda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,811

(22) Filed: May 27, 1998

(65) Prior Publication Data
US 2002/0164147 A1 Nov. 7, 2002

(30) Foreign Application Priority Data
May 30, 1997 (JP) .............................. 9-141800

(51) Int. Cl.[7] ............................ H04N 5/76; H04N 5/225
(52) U.S. Cl. ...................... 386/46; 386/117; 386/125
(58) Field of Search .................. 386/45, 125, 126, 386/117; 358/906, 909.1; 348/207, 231, 232, 233, 231.1, 231.2; 711/100, 170, 171, 172, 173; 707/205, 206; 360/48; H04N 5/76, 5/92, 5/781, 9/79

(56) References Cited

U.S. PATENT DOCUMENTS

| | | | | | |
|---|---|---|---|---|---|
| 4,918,474 | A | * | 4/1990 | Kawamura et al. | 354/173.1 |
| 5,532,740 | A | * | 7/1996 | Wakui | 358/906 |
| 5,574,907 | A | * | 11/1996 | Jernigan, IV et al. | 360/48 |
| 5,646,871 | A | * | 7/1997 | Cadot | 714/26 |
| 5,689,303 | A | * | 11/1997 | Kuroiwa | 386/117 |
| 5,737,743 | A | * | 4/1998 | Ooe et al. | 711/112 |
| 5,872,905 | A | * | 2/1999 | Ono et al. | 711/100 |
| 5,956,745 | A | * | 9/1999 | Bradford et al. | 707/205 |
| 6,115,799 | A | * | 9/2000 | Ogawa | 711/171 |
| 6,189,081 | B1 | * | 2/2001 | Fujio | 711/171 |
| 6,192,191 | B1 | * | 2/2001 | Suga et al. | 348/231 |
| 6,334,027 | B1 | * | 12/2001 | Fukuoka et al. | 386/117 |

* cited by examiner

Primary Examiner—Thai Tran
(74) Attorney, Agent, or Firm—Robin, Blecker & Daley

(57) ABSTRACT

An image recording apparatus which can re-allocate image data by removing vacant areas formed as a result of deletion when an image file is deleted from a recording medium of an image recording apparatus of a camera. The image data to be re-allocated are not limited to those in a new image file to be recorded, but include those in already recorded image files. Upon re-allocation, image data are re-allocated so that the track numbers of image files to be re-allocated on the disk sequentially increase.

36 Claims, 18 Drawing Sheets

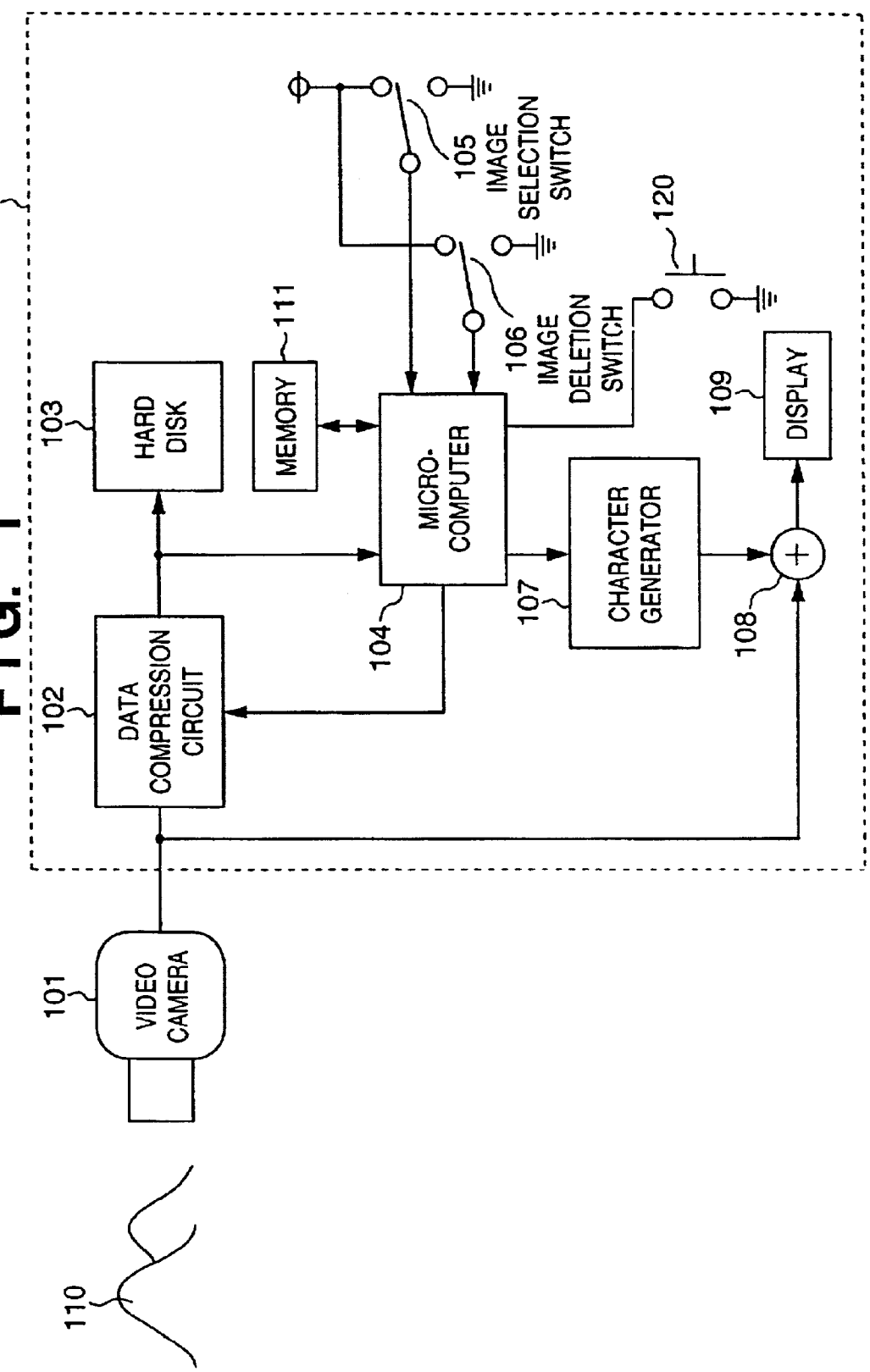

FIG. 2B

| IMAGE 1 | 11 | 12 | 13 | 14 | 15 | 16 |
|---|---|---|---|---|---|---|
| IMAGE 2 | 17 | 18 | 21 | | | |
| IMAGE 3 | 22 | 23 | 24 | 25 | | |

FIG. 2C

| IMAGE 1 | 11 | 12 | 13 | 14 | 15 | 16 |
|---|---|---|---|---|---|---|
| | 17 (VACANT) | 18 (VACANT) | 21 (VACANT) | | | |
| IMAGE 3 | 22 | 23 | 24 | 25 | | |

FIG. 2D

| IMAGE 1 | 11 | 12 | 13 | 14 | 15 | 16 |
|---|---|---|---|---|---|---|
| IMAGE 3 | 17 | 18 | 21 | 22 | 23 | 24 |
| | 25 (VACANT) | 26 (VACANT) | 27 (VACANT) | | | |

FIG. 2E

| | | | | | | |
|---|---|---|---|---|---|---|
| IMAGE 1 | 11 | 12 | 13 | 14 | 15 | 16 |
| VACANT | 17 | 18 | | | | |
| IMAGE 3 | 21 | 22 | 23 | 24 | 25 | |
| IMAGE 4 | 26 | 27 | 28 | | | |
| VACANT | 31 | 32 | | | | |

FIG. 2F

| | | | | | | |
|---|---|---|---|---|---|---|
| IMAGE 1 | 11 | 12 | 13 | 14 | 15 | 16 |
| IMAGE 5 | 17 | 18 | | | | |
| IMAGE 3 | 21 | 22 | 23 | 24 | 25 | |
| IMAGE 4 | 26 | 27 | 28 | | | |
| IMAGE 5 | 31 | 32 | | | | |

FIG. 2G

| | | | | | | |
|---|---|---|---|---|---|---|
| IMAGE 1 | 11 | 12 | 13 | 14 | 15 | 16 |
| IMAGE 3 | 17 | 18 | 21 | 22 | 23 | |
| IMAGE 4 | 24 | 25 | 26 | | | |
| IMAGE 5 | 27 | 28 | 31 | 32 | | |

SCREEN 1

SCREEN 2

SCREEN 3

SCREEN 4

REMAINING AMOUNT DISPLAY SCREEN

DISK REMAINING AMOUNT : 20" 15'

OPTIMIZATION RECOMMENDATION SCREEN

RECOMMEND OPTIMIZATION

REMAINING AMOUNT WILL INCREASE
BY 5 MIN AFTER DATA OPTIMIZATION

PRESS OPTIMIZATION EXECUTION
SWITCH

FIG. 15A

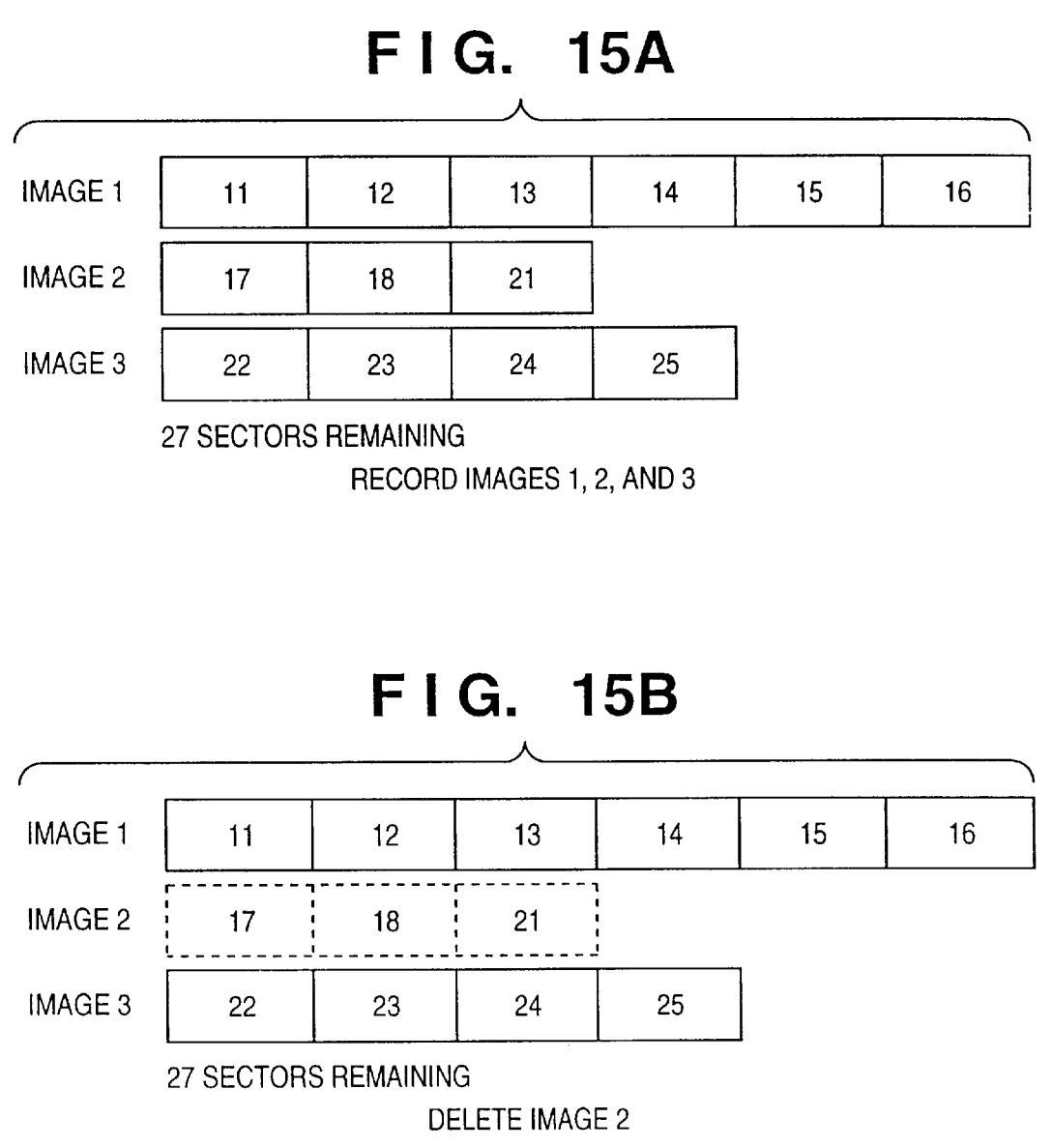

| IMAGE 1 | 11 | 12 | 13 | 14 | 15 | 16 |
|---|---|---|---|---|---|---|
| IMAGE 2 | 17 | 18 | 21 | | | |
| IMAGE 3 | 22 | 23 | 24 | 25 | | |

27 SECTORS REMAINING

RECORD IMAGES 1, 2, AND 3

FIG. 15B

| IMAGE 1 | 11 | 12 | 13 | 14 | 15 | 16 |
|---|---|---|---|---|---|---|
| IMAGE 2 | 17 | 18 | 21 | | | |
| IMAGE 3 | 22 | 23 | 24 | 25 | | |

27 SECTORS REMAINING

DELETE IMAGE 2

F I G. 15C

| IMAGE 1 | 11 | 12 | 13 | 14 | 15 | 16 |
| IMAGE 2 | 17 | 18 | 21 | | | |
| IMAGE 3 | 17 | 18 | 21 | 22 | | |
| IMAGE 4 | 23 | 24 | 25 | 26 | 27 | |

22 SECTORS REMAINING
ADDITIONALLY RECORD IMAGE 4

F I G. 15D

| IMAGE 1 | 11 | 12 | 13 | 14 | 15 | 16 |
| IMAGE 3 | 17 | 18 | 21 | 22 | | |
| IMAGE 4 | 23 | 24 | 25 | 26 | 27 | |

25 SECTORS REMAINING
AFTER DATA OPTIMIZATION

IMAGE RECORDING APPARATUS HAVING COMPUTER READABLE RECORDING MEDIUM FOR RECORDING IMAGE DATA

BACKGROUND OF THE INVENTION

The present invention relates to an image recording apparatus which is suitably used for a video camera and the like, and has a recording medium for recording image data such as moving images, still images, and the like (e.g., a solid-state magnetic disk memory, magnetooptical disk memory, optical disk memory, and the like).

As an image recording/reproduction apparatus which records an image and reproduces the recorded image, a video tape recorder that records an analog image signal on a magnetic tape is known. Contrary to such analog image recording/reproduction apparatus, a digital VTR that converts an image signal into a digital signal, and records the digital signal on a magnetic tape, a disk memory that records a digital signal on a solid-state disk or magnetooptical disk, a solid-state memory video that records a digital signal on a solid-state memory such as a flash memory, SRAM, or the like, and the like have been proposed. Such video recording systems compress an input digital signal to reduce the information volume, and can record a large amount of moving image information and still image information with a small storage capacity.

Various compression methods for the image recording apparatus are available. For example, in a method using orthogonal transformation, an image is segmented into a plurality of blocks each having n pixels in the horizontal direction×n pixels in the vertical direction, the orthogonal transform such as the discrete cosine transform (DCT) or the like is calculated in units of blocks, and each coefficient is rounded to a predetermined number of bits, thus quantizing the image. Since image information is offset to the lower-frequency range, the data volume can be reduced by decreasing the number of bits for high-frequency components. In variable length coding such as Huffman coding or the like, efficient data compression is attained by assigning shorter codes to bit sequences with higher probabilities of occurrence.

Upon compressing a moving image, the difference between neighboring frames is extracted by using a strong correlation between neighboring frames as a nature of moving images, thus greatly compressing the image.

Various moving image recording systems have been proposed. In such system, a moving image is compressed by combining various compression techniques mentioned above to reduce its data volume, and the compressed image data is recorded on a solid-state magnetic disk memory, optical disk memory, or the like.

When recording and deletion of image data onto and from a recording medium are repeated several times, vacant spaces from which data have been deleted and spaces of effective image data which remain undeleted respectively get fragmented in the recording medium, and the number of broad (long) spaces that can continuously record image data becomes small. As a result, since new image data is recorded on distributed small regions, the time required for seek or access on the recording medium is prolonged, thus disturbing high-speed data I/O. Especially since the moving image recording system has a large moving image data volume per unit time, I/Os with the disk memory must be done as fast as possible. For this reason, an increase in time required for seek or access poses a serious problem.

SUMMARY OF THE INVENTION

The present invention has been made to solve the above-mentioned problems, and has as its object to provide an image recording apparatus and method that can always assure a continuous recording space of image data on a recording medium.

It is another object of the present invention to provide an image recording apparatus and method which can appropriately determine the re-allocating timing.

It is still another object of the present invention to provide a recording apparatus and method, which can prevent image data blocks from being randomly scattered onto a recording medium upon recording a new image file.

Further objects, features and advantages of the present invention will become apparent from the following detailed description of embodiments of the present invention with reference to the accompanying drawings.

BRIEF DESCRIPTION OF THE DRAWINGS

FIG. 1 is a block diagram showing the arrangement of a recording apparatus according to the first embodiment of the present invention;

FIGS. 2B, 2C, 2D, 2E, 2F, and 2G show the operations of the recording apparatus according to the first embodiment of the present invention;

FIGS. 15A, 15B, 15C, and 15D are views for explaining optimization processes of the recording apparatus of the seventh embodiment.

PREFERRED EMBODIMENTS OF THE INVENTION

Figure 2A:
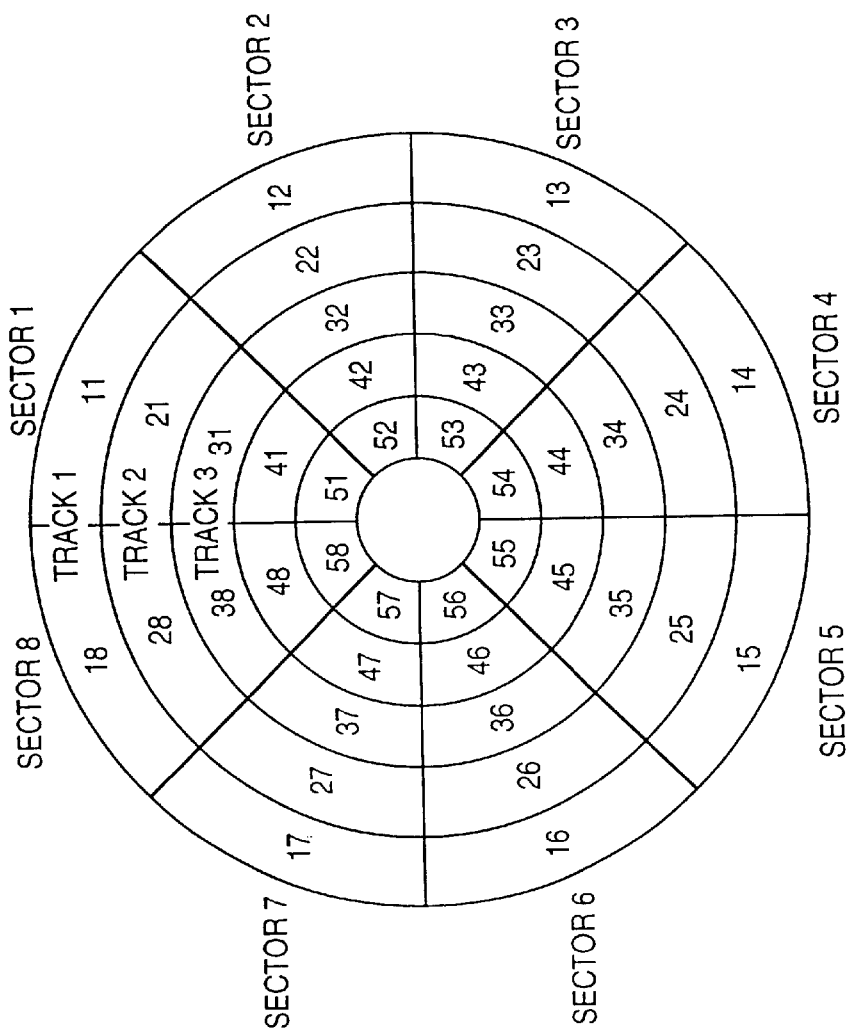
FIG. 2A shows the recording format of a disk used in the recording apparatuses of all the embodiments.

Embodiments in which the present invention is applied to a digital video camera will be described hereinafter with reference to the accompanying drawings.

(First Embodiment)

FIG. 1 shows the arrangement of a digital video camera according to the first embodiment of the present invention. In FIG. 1, reference numeral 101 denotes a video camera; 200, an image recording apparatus; and 110, an object. Note that the video camera 101 may incorporate the image recording apparatus 200 so that the entire system is used as a video camcorder.

The image recording apparatus 200 mainly has a hard disk 103, display 109, and microcomputer 104. The display 109 displays the title of an image to be deleted, and the like, and also displays a user interface handling deletion.

In FIG. 1, an image signal of the object 110 sensed by the video camera 101 is input to an adder 108, and is also input to a data compression circuit 102. The data compression circuit 102 compresses the input data at a compression ratio and timing directed by the microcomputer 104, and records the compressed data on the hard disk 103 as a recording medium. The microcomputer 104 selects and deletes image data recorded on the hard disk 103 on the basis of the states of an image selection switch 105 and image deletion switch 106.

In this embodiment, the image selection switch 105 and deletion switch 106 use momentary switches, and upon depression of these switches, they output predetermined signals. When the deletion switch 106 has been pressed, an image selected by the selection switch 105 is deleted. When the image is deleted, the area from which the image data has been deleted becomes vacant. In this specification, the compaction operation for removing such vacant portions is called "re-allocating images". That is, the hard disk 103 is optimized by re-allocating data stored thereon.

Character or graphics data for a user interface handling the image selection, deletion, and re-allocation are generated by a character generator (or graphics generator) 107. In this specification, the character generator for generating character fonts is used.

A signal from the generator 107 is mixed with the image signal sent from the video camera 101 by the adder 108, and the mixed signal is displayed on the display 109.

Reference numeral 111 denotes an IC memory for storing a program (shown in the flow charts in FIGS. 3, 6, and 7) executed by the microcomputer 104. The memory 111 may be replaced by a magnetic storage medium, magnetooptical disk, optical disk, CD-ROM, or the like in addition to the semiconductor memory.

Re-allocation of image data on the hard disk 103 will be described below with reference to FIG. 2A.

FIG. 2A shows the data arrangement on the hard disk 103. In this embodiment, the disk 103 is used for single-side recording and is formatted to have five tracks/surface, and eight sectors/track for the sake of simplicity. The hard disk 103 has concentric recording tracks 1, 2, 3, 4, and 5 from the outer side, and each track is further segmented into sectors 1 to 8. The respective cuts of image data are recorded on the hard disk 103 in units of sectors. In the following description, the first sector on the first track is expressed by "11", the fifth sector on the third track is expressed by "35", and so on, for the sake of convenience.

The storage state of image data on the disk 103, and re-allocation of image data after some data are deleted will be explained below with reference to FIGS. 2B and 2C.

When image data are recorded on the hard disk 103 that records no data, they are recorded in turn from sector 1 on track 1 (sector 11). Therefore, "image 1" which requires a recording capacity for six sectors is recorded using six areas, i.e., sectors 11, 12, 13, 14, 15, and 16. Also, "image 2" which requires a storage capacity for three sectors is recorded from sector 17 next to the last sector (sector 16) of "image 1", and is then recorded on sector 18, and sector 21 on the second track. Furthermore, "image 3" which requires a storage capacity for four sectors is recorded from sector 22 next to the last sector (sector) 21 of "image 2", and is then recorded on sectors 23, 24, and 25. When another image is to be continuously stored, it is stored to be continuous with the previous data on the hard disk.

Assume that "image 2" is deleted after "image 1", "image 2", and "image 3" are written. Since "image 2" occupies three areas, i.e., sectors 17, 18, and 21, these areas become vacant after the data of "image 2" is deleted, as shown in FIG. 2C.

The image recording apparatus 200 of this specification can break up image data into a plurality of sectors, and can store them on the disk 103. In this case, an algorithm for assigning the image data to be stored to vacant sectors is as follows:

I: When a plurality of continuous sectors equal to the volume of the image data to be stored are vacant, the image data is stored in the continuous vacant areas.

II: When continuous vacant areas equal to the volume of the image data to be stored cannot be assured, the image data to be stored is segmented into pieces, and these pieces are stored in a plurality of vacant areas, which are not continuous.

The image recording apparatus 200 can execute operations called "re-allocation" and "optimization" of the storage area. Note that re-allocation removes vacant sectors formed between neighboring blocks of continuous sectors where image data are stored.

Also, optimization has the follow meanings:

III: When new image data is recorded, the optimization assures continuous vacant areas by moving other already stored image data so as to prevent that image data from being stored on a plurality of random tracks, and stores the image data in the assured continuous vacant areas. In this case, when the image data has a large volume, it may be stored across a plurality of tracks. However, since the tracks increase or decrease successively (i.e. one by one), the idle seek time is minimized upon recording.

IV: When an image data file already stored on a plurality of random tracks is to be optimized, the optimization moves such image data file to continuous vacant areas, the track numbers of which increase or decrease continuously. In this case, if another image data must be moved for attaining optimization, such image data is also moved.

For example, when "image 1" and "image 3" arranged as shown in FIG. 2C are re-allocated, "image 3" is moved to occupy sectors 17 to 24, and sectors 25 to 27 become vacant areas, as shown in FIG. 2D.

The "optimization" will be explained below with reference to FIGS. 2E, 2F, and 2G.

Assume that "image 1", "image 3", and "image 4" are recorded on the disk 103, and sectors 17 and 18 are isolated, continuous vacant areas, as shown in FIG. 2E. When another "image 5" that requires a storage capacity for five sectors is to be written in this recording state, if some image data of "image 5" are to be written on vacant sectors 17 and 18, as shown in FIG. 2F, the remaining image data are stored on sector 31 and the subsequent sectors. That is, "image 5" is divisionally recorded on some areas on track 1 and those on track 3 to sandwich "image 4" therebetween, i.e., "image 5" is divided into two pieces by "image 4". In other words, "image 5" is divided into two different, discontinuous areas. When such image data stored across two tracks is to be read out from the disk 103 so as to reproduce it, random seek of a read head (not shown) is required in the disk 103, resulting in low recording speed (read speed upon reproduction) on the hard disk. Of course, when "image 5" was written, seek to random tracks was required.

When an "optimization mode" is set, optimization is done. That is, "image 1" is fixed in position, but "image 3" written in sectors 21 to 25 (FIG. 2E) is moved to sectors 17, 18, 21, 22, and 23, as shown in FIG. 2G. Similarly, "image 4" written in sectors 26, 27, and 28 (FIG. 2E) is moved to sectors 24, 25, and 26, thus assuring sectors 27, 28, 31, and 32 as vacant areas. "Image 5" is then written in these continuous vacant areas. Although "image 5" is written across two tracks, since written sectors are continuous, no random seek occurs.

Figure 3:
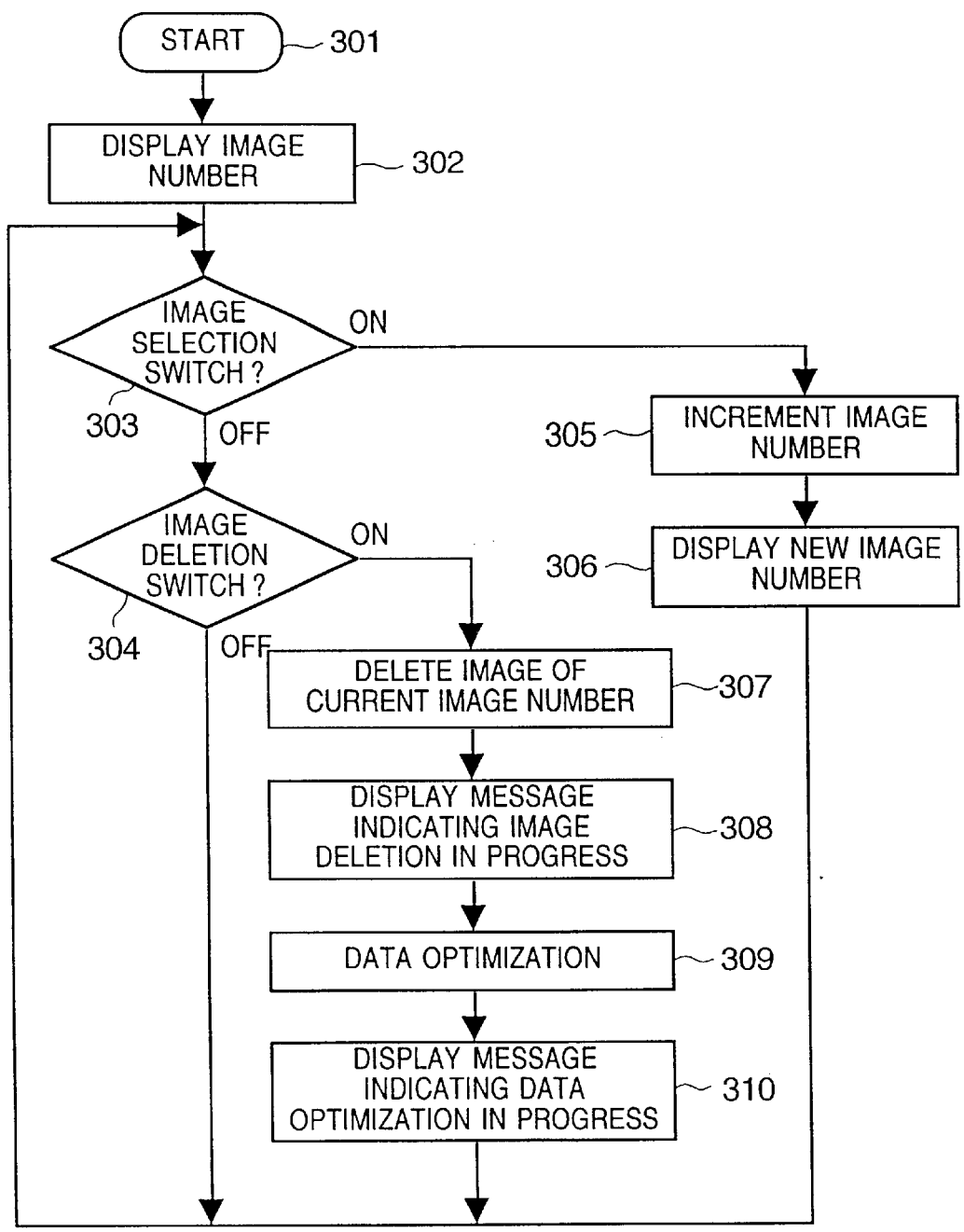
FIG. 3 is a flow chart showing the control sequence of the recording apparatus according to the first embodiment of the present invention.
Figure 4A:
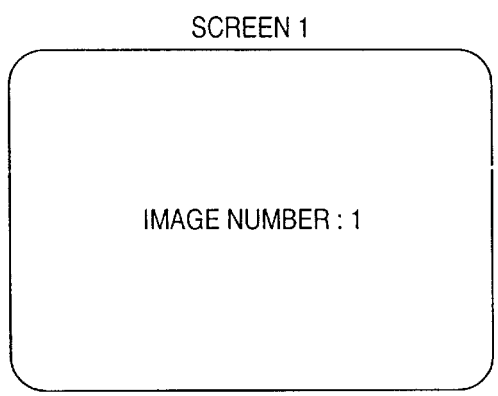
FIGS. 4A, 4B, 4C, and 4D show the display operations of the recording apparatus according to the first embodiment of the present invention.
Figure 4B:
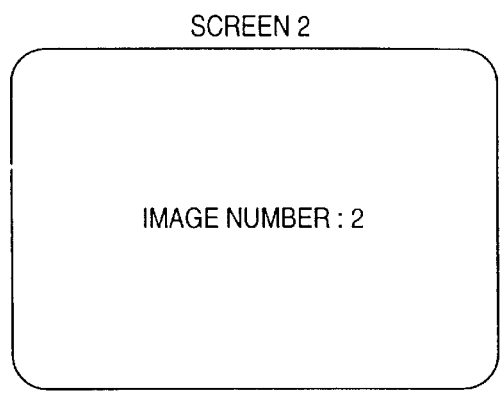
Figure 4C:
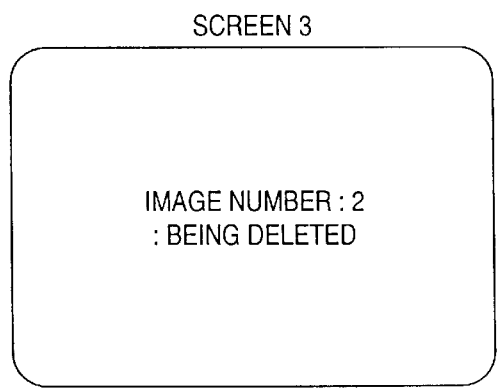
Figure 4D:
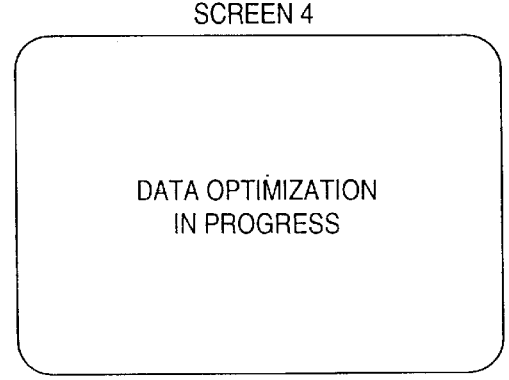

FIG. 3 is a flow chart showing the operation of the microcomputer 104, and including steps S301 to S310. These steps S301 to S310 are implemented in accordance with a program recorded on the memory 111. FIGS. 4A to 4G show an example of display processes during execution of the sequence shown in FIG. 3. That is, in the image recording apparatus of this specification, an image file is specified by, e.g., an image number, which is presented to the user, so that he or she can recognize the image of interest.

In FIG. 3, the flow starts from step S301, and an image number is displayed on the display 109 via the character generator 107 (S302). For example, "image number: 1" is displayed, as shown in screen 1 in FIG. 4A. It is then checked if the image selection switch 105 is ON (S303). If the switch 105 is ON, the image number is incremented by 1 (S305), and the new image number is displayed (S306). For example, the image number is incremented and displayed like "image number: 2" shown in screen 2 in FIG. 4B. More specifically, when the user holds the selection switch 105 ON until the desired image number is displayed on the display 109 in the loop of step S303→step S305→step S306→step S303, he or she can select the image to be deleted.

If it is detected in step S303 that the image selection switch 105 is turned off, this means that user has confirmed the image number of the image to be deleted displayed on the display 109. In the example shown in FIG. 4B, the image of "image number 2" is selected as the image to be deleted. It is checked if the image deletion switch 106 is ON (S304). If the switch 106 is ON, the image corresponding to the currently displayed image number is deleted (S307). During deletion of the image, for example, a message "image number: 2: deleting" is displayed, as shown in screen 3 in FIG. 4C.

After the image has been deleted, re-allocation and optimization of the disk are done as needed in step S309. That is, if isolated vacant areas are present, re-allocation is done; if an image file that needs random seek is present, optimization is done. When re-allocation or optimization is in progress, a message indicating this is displayed (S310). For example, a message "optimizing data" is displayed to inform the user of it, as shown in screen 4 in FIG. 4D.

As the algorithms for re-allocation and optimization, various methods, such as a method of temporarily copying an image signal to vacant areas of the hard disk, and then copying it to vacant areas where it is to be re-allocated (in units of images or sectors), a method of writing an image in units of sectors from the beginning, and the like may be used. Note that a memory for temporarily saving data in re-allocation is not limited to the hard disk but other memories may be used, and the work memory suffices to have a capacity for only one sector.

In the first embodiment described above, since re-allocation and/or optimization are/is started in response to deletion of a file by the user, wasteful vacant areas are minimized, and sufficient recording areas can always be assured.

(Second and Third Embodiments)

In the first embodiment described above, re-allocation and/or optimization are/is started in response to deletion of a file by the user. In the second embodiment, re-allocation and/or optimization are/is started in response to the power ON event by the user.

Figure 5:
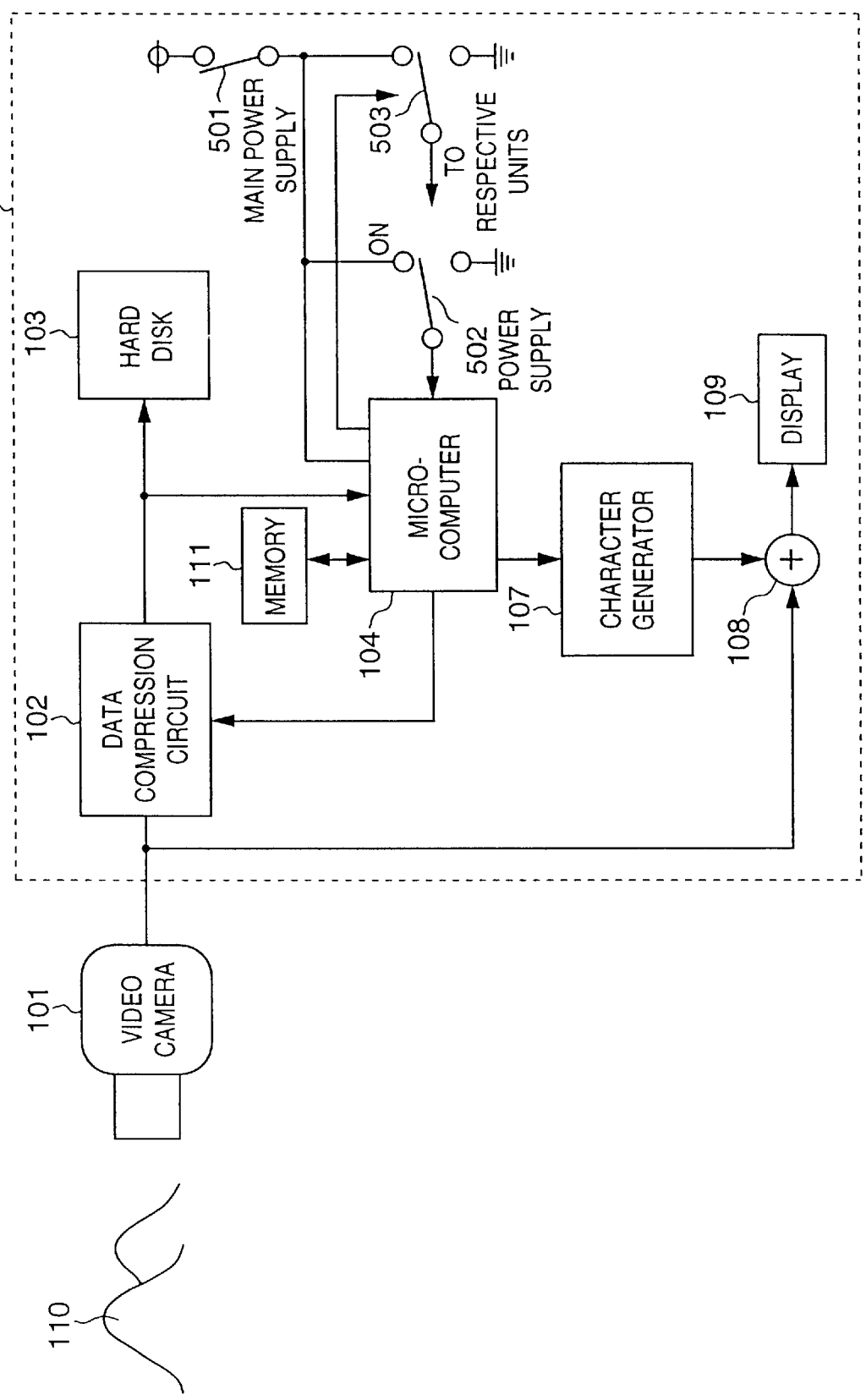
FIG. 5 is a block diagram showing the arrangement of a recording apparatus according to the second and third embodiments of the present invention.

FIG. 5 shows the arrangement of the second and third embodiments. Since the same reference numerals in FIG. 5 denote parts having the same functions as those in FIG. 1, a detailed description thereof will be omitted.

In FIG. 5, a switch 501 is, e.g., a seesaw type main power switch. When this switch 501 is turned on, the microcomputer 104 and switches 502 and 503 are activated. More specifically, as long as the switch 501 is ON, a predetermined DC voltage is supplied to the microcomputer 104 and the like, and as a result, the microcomputer 104 and the like are made active.

The switch 502 is, e.g., a momentary switch. When the user turns on this switch 502, the microcomputer 104 can be informed of the start of use of the recording apparatus 200 by the user.

When the switch 502 is turned on, the microcomputer supplies an activation signal to the switch 503. The switch 502 is a current switch comprising, e.g., a power transistor and the like, and is turned on and closed upon reception of the activation signal. When the switch 503 is closed, the DC voltage is supplied to the respective units in the video camera 101 and recording apparatus 200 via the switches 501 and 503. That is, when the switch 502 is turned on, the power supply voltage is supplied to the individual units such as the video camera 101, data compression circuit 102, hard disk 103, character generator 107, display 109, and the like to make them active.

Figure 6:
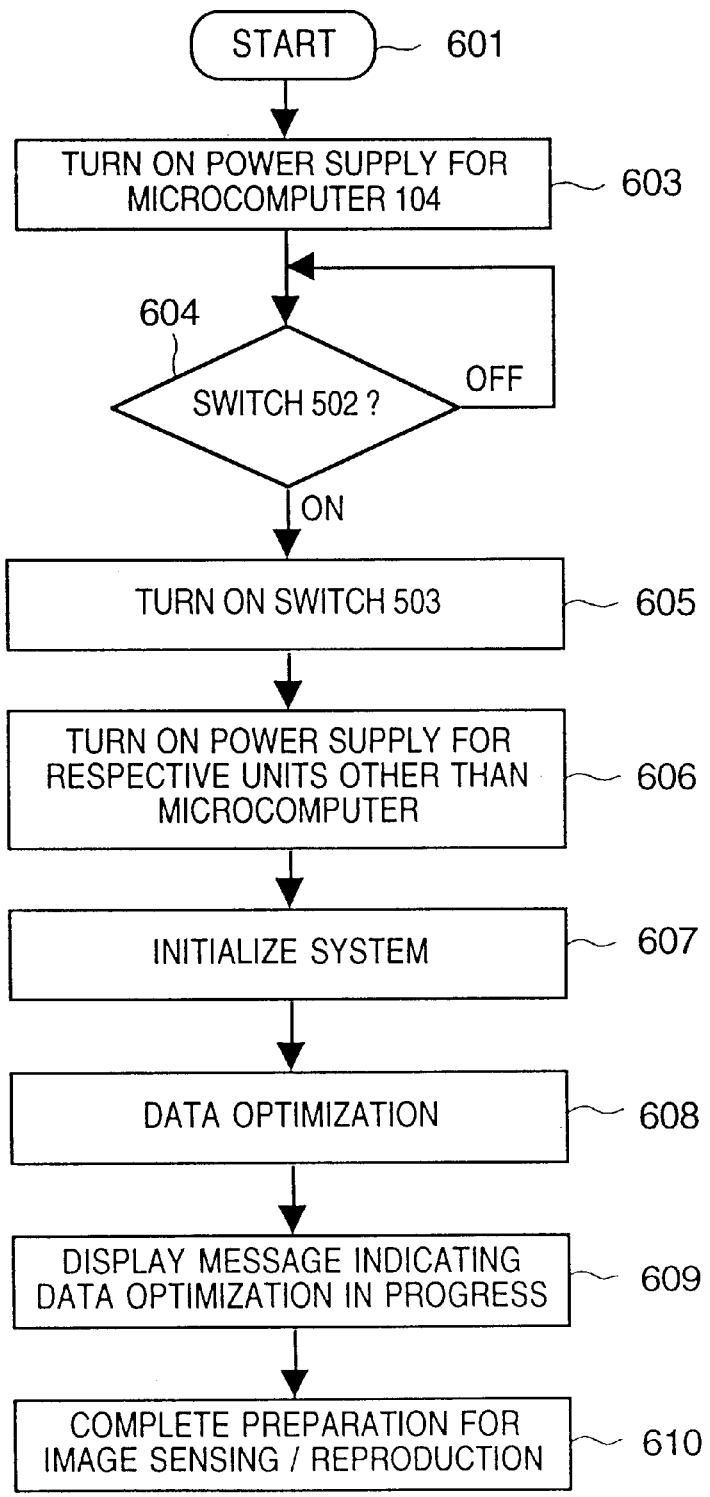
FIG. 6 is a flow chart showing the control sequence according to the second embodiment of the present invention.

FIG. 6 is a flow chart showing the control sequence of the microcomputer 104 according to the second embodiment. The microcomputer 104 checks the state of the switch 502 (S604). If the switch 502 is OFF, the microcomputer 104 keeps checking the state of the switch 502. If the microcomputer 104 detects that the switch 502 is ON, it supplies a signal for closing the switch 503 to the switch 503 (S605), thereby turning on the power supplies of the individual units other than the microcomputer (S606).

After the power supplies of the individual units are ON, the microcomputer initializes the system (S607), and optimizes the hard disk 103 by re-allocating data on it (S608). At this time, a message indicating that optimization is in progress is displayed (S609). In this way, preparation for image sensing or reproduction is completed (S610).

(Third Embodiment)

In the third embodiment, re-allocation and/or optimization are/is started in response to the power OFF event at the camera or recording apparatus by the user. Hence, the third embodiment uses the hardware arrangement of the second embodiment.

Figure 7:
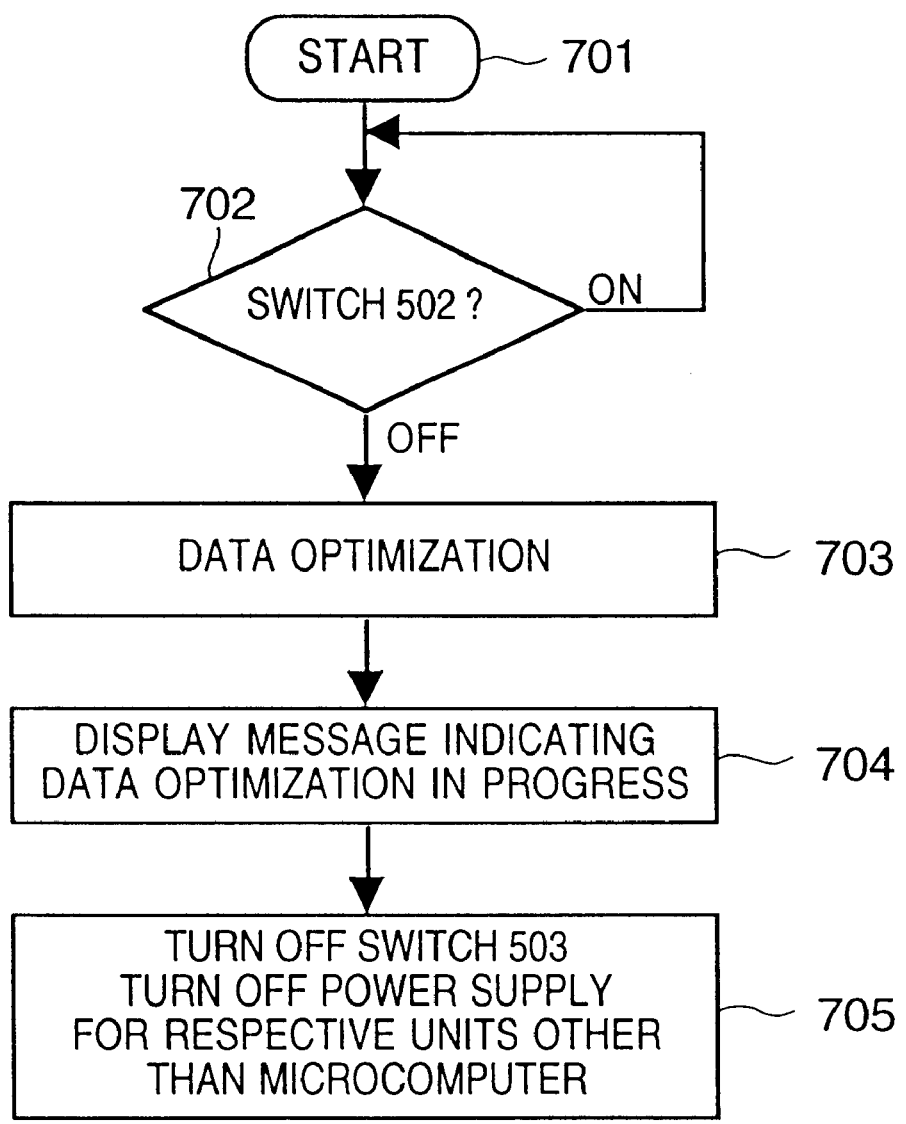
FIG. 7 is a flow chart showing the control sequence of the recording apparatus according to the third embodiment of the present invention.

FIG. 7 is a flow chart showing the operation of the third embodiment.

The microcomputer 104 monitors in step S702 if the switch 502 is turned off. If the microcomputer 104 detects that the switch 502 is turned off, it performs re-allocation and/or optimization of data on the hard disk 103 (S703), and displays a message indicating that re-allocation and/or optimization are/is in progress (S704). Upon completion of optimization, the microcomputer 104 opens the switch 503 to stop power supply to the respective units other than the microcomputer (S705).

In each of the above embodiments, the magnetic recording hard disk 103 is used as a recording medium. Alternatively, an optical disk, magneto-optical disk, magnetic tape, flash memory, and RAM may be used.

According to the first to third embodiments, when vacant spaces have been or are about to be formed between neighboring data on the hard disk 103 as a result of deletion or the like of data, re-allocation is done to fill the vacant spaces by moving data behind the vacant spaces, and optimization is done as needed. Hence, data can always be recorded on continuous areas.

In the first to third embodiments, re-allocation or optimization is always done in response to a predetermined event such as data deletion, power ON, or the like. Alternatively, re-allocation or optimization may be done only when the user designates it. More specifically, a mode switch 120 (FIG. 1) may be arranged, and only when an enable mode is set by this switch, the above-mentioned re-allocation or optimization may be done.

(Fourth Embodiment)

The fourth embodiment of the present invention will be explained below.

In the first to third embodiments, re-allocation and/or optimization of image files are/is automatically done in response to deletion of an image file or power ON or OFF event. However, in the fourth embodiment, since the image recording apparatus of the present invention is normally used in combination with a battery-driven camera, re-allocation and/or optimization of image files are/is granted only when the battery power is sufficient or when electric power is supplied from an AC power supply. This is because re-allocation and/or optimization of image files require or requires a considerably long time.

Figure 8:
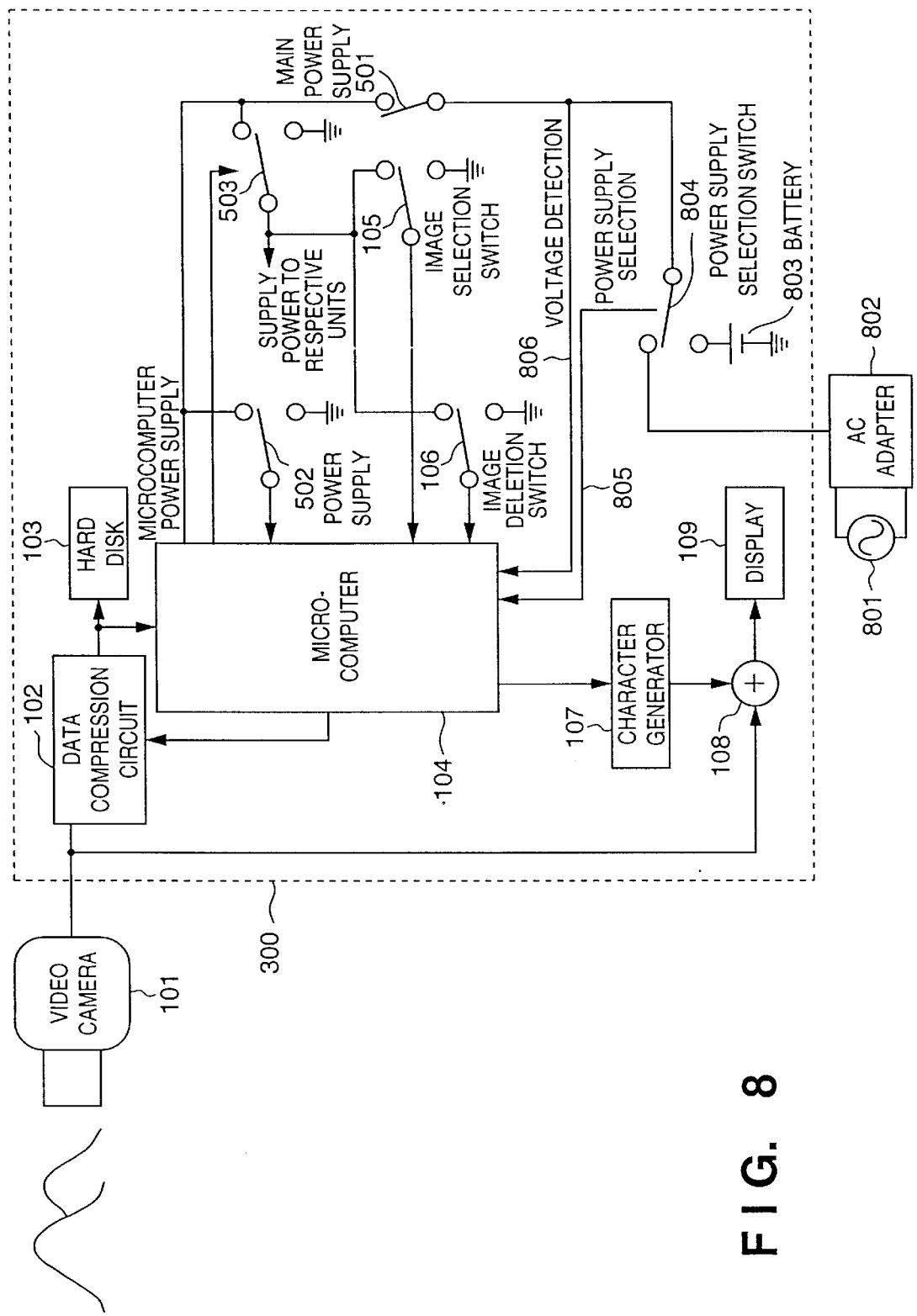
FIG. 8 is a block diagram showing the arrangement of a recording apparatus according to the fourth embodiment of the present invention.

FIG. 8 is a block diagram showing the arrangement according to the fourth embodiment of the present invention.

In FIG. 8, an image output from a video camera 101 is supplied to a data compression circuit 102, and is compressed at a compression ratio and timing designated by a microcomputer 104. The compressed image signal is then supplied to a hard disk 103.

Also, the image signal output from the video camera is added to information of a control state such as image selection, image deletion, re-allocation, or the like output from a character generator 107 by an adder 108, and is displayed on a display 109.

The arrangement of the fourth embodiment is substantially the same as that in the first embodiment except for the power supply system. The power supply system of the fourth embodiment will be described below. An image recording apparatus 300 of the fourth embodiment has a built-in battery 803, and an AC adapter 802 that allows use of an AC power supply 801 can be connected to the main body of the apparatus 300. Whether the battery 803 or AC power supply 801 is used can be selected by the user by switching a power supply selection switch 804. When one of these power supplies is selected, a DC voltage output from the adapter 802 or battery 803 is supplied to a main power switch 501.

The arrangements and functions of the switch 501 and switches 502 and 503 of the fourth embodiment are the same as those of the switches 501, 502, and 502 in the second and third embodiments.

When the switch 804 has been operated, the state of the switch 804 is supplied to the microcomputer 104 as a power supply selection signal via a signal line 805. The voltage value of the DC voltage supplied from the adapter 802 or battery 803 is monitored by the microcomputer 104 via the signal line 805, and the microcomputer 104 can detect a low-voltage state.

Switches 105 and 106 of the fourth embodiment are the same as those in the second embodiment. More specifically, the switch 105 is used for selecting image information recorded on the hard disk 103, and the switch 106 is a deletion switch for deleting image information selected by the image selection switch 105.

Figure 9:
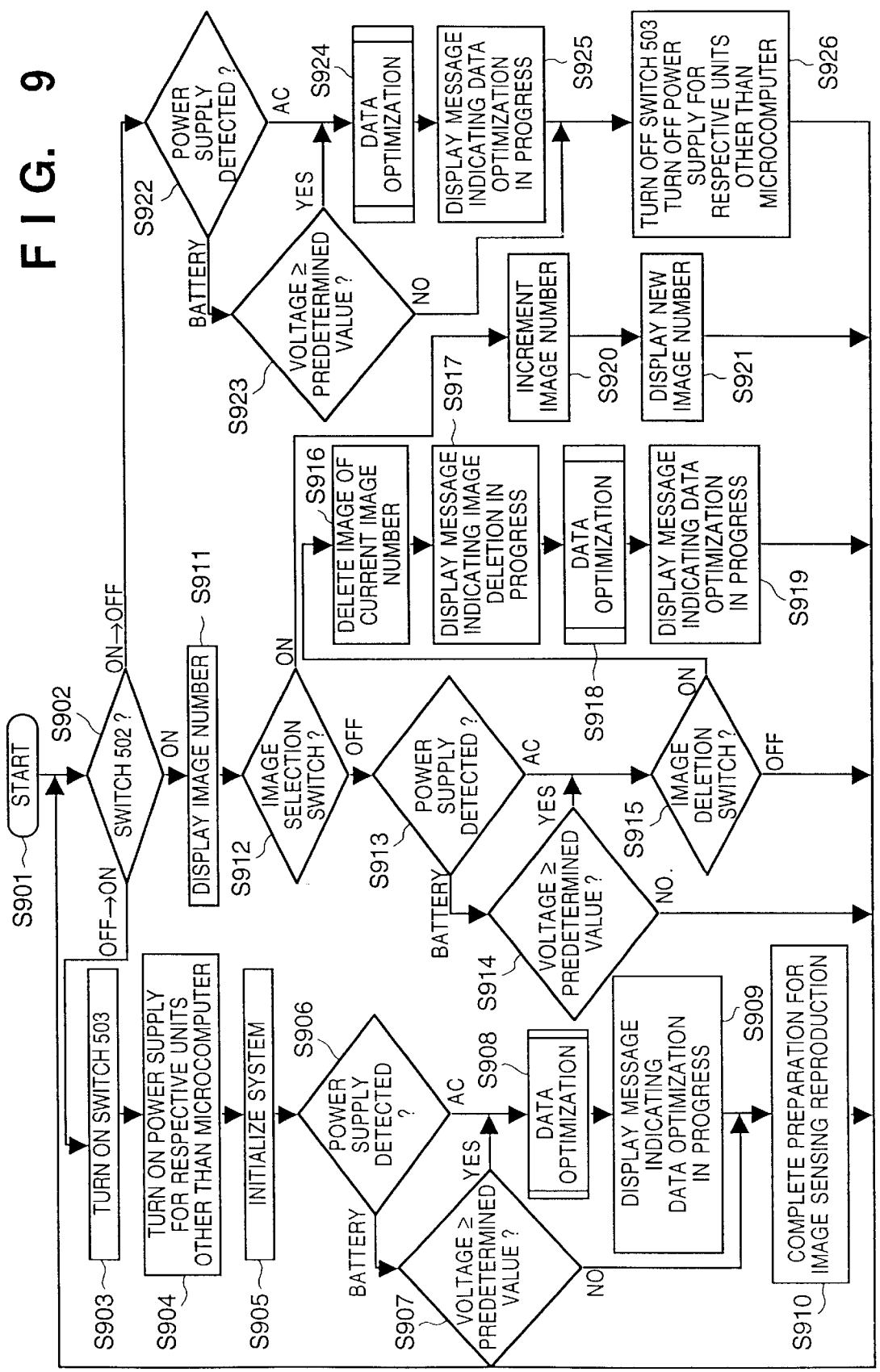
FIG. 9 is a flow chart showing the control sequence of the recording apparatus according to the fourth embodiment of the present invention.

The operation of the video camera apparatus with the above arrangement will be explained below with reference to the flow chart in FIG. 9.

When the processing starts in step S901, the state of the switch 502 is checked in step S902. If the switch 502 is switched from ON to OFF, the flow advances to step S903; if the switch 502 is switched from ON to OFF, the flow advances to step S922. Also, if the switch 502 is ON, the flow advances to step S911.

If the switch 502 is ON, a number of image information is displayed in step S911, and if it is determined in step S912 that the image selection switch 105 is ON, the flow advances to step S920. The number of image information is incremented by 1 in step S920, and the new number of image information is displayed in step S921.

On the other hand, if it is determined in step S912 that the image selection switch 105 is OFF, the flow advances to step S913 to detect the type of power supply (i.e., if the apparatus is driven by the battery or AC power supply).

Since electric power supplied from the AC power supply 801 is stable, a voltage drop is unlikely to occur during re-allocation or optimization. Hence, when electric power is supplied form the AC power supply 801, image deletion is granted, and the state of the deletion switch 106 is checked.

On the other hand, the battery 803 relatively frequently encounters a low-power state. Hence, when electric power is supplied from the battery 803, the flow advances from step S913 to step S914 to check if the voltage is equal to or higher than a predetermined value. If the voltage is lower than the predetermined voltage, a low-voltage state is likely to occur soon, and a user's deletion instruction must be denied. Hence, if the voltage is equal to or higher than the predetermined value, the flow advances to step S915 to execute processing according to the instruction input by the image deletion switch 105; if the voltage is lower than the predetermined voltage, the flow returns to step S902 to consequently deny deletion.

More specifically, with this processing, when the AC power supply is used and the power supply voltage from the battery is equal to or higher than the predetermined value, deletion is granted; when the battery is used, and its output power supply voltage is lower than the predetermined value, deletion is denied.

If it is determined in step S915 that the image deletion switch 106 is ON to issue a deletion instruction, the flow advances to step S916 to delete image information corresponding to the currently displayed image number. In step S917, a message indicating that deletion of image information is in progress is displayed. Re-allocation and/or optimization are/is done in step S918 in the same manner as in the above embodiments, and a message indicating that the re-allocation and/or optimization are/is in progress is displayed in step S919. After that, the flow returns to step S902.

If it is determined in step S902 that the switch 502 is switched from OFF to ON, the switch 503 is turned on step S903 to supply a power supply voltage to the respective circuit units other than the microcomputer 104, and the system is initialized in step S905.

Subsequently, the type of power supply is detected in step S906. If the type of power supply is the AC power supply, re-allocation and/or optimization are/is done in step S908 in the same manner as in the above embodiments, and a message indicating that the re-allocation and/or optimization are/is in progresses displayed in step S909. After preparation for image sensing/reproduction is complete in step S910, the flow returns to step S902.

If it is determined in step S906 that the power supply is the battery, it is checked in step S907 if the voltage output from the battery is equal to or higher than a predetermined value. If the voltage is equal to or higher than the predetermined value, the flow advances to step S908 to execute the re-allocation and/or optimization; if the voltage is lower than the predetermined value, the flow skips re-allocation and/or optimization in step S908, and after preparation for image sensing/reproduction is complete in step S910, the flow returns to step S902.

A case will be explained below wherein it is determined in step S902 that the switch 502 is switched from ON to OFF, and the flow advances to step S922.

The type of power supply is checked in step S922. If the type of power supply is the AC power supply, re-allocation and/or optimization are/is done in step S924 in the same manner as in the above embodiments, and a message indicating that the re-allocation and/or optimization are/is in progress is displayed in step S925. In step S926, the switch 503 is then turned off to stop power supply to the respective circuits other than the microcomputer 104.

If it is determined in step S922 that the type of power supply is the battery, it is checked in step S923 if the voltage output from the battery is equal to or higher than a predetermined value. If the voltage is equal to or higher than the predetermined value, the flow advances to step S924 to execute the arrangement and/or optimization; if the voltage is lower than the predetermined value, the flow skips re-allocation and/or optimization in step S924, and the processing in step S926 is executed. After that, the flow returns to step S902.

With the above processing, only when the power supply is the AC power supply and the battery remaining capacity is sufficient, re-allocation and/or optimization are/is done, thus assuring integrity of image files.

(Fifth Embodiment)

The fifth embodiment of the present invention will be explained below. This embodiment pertains to another example of re-allocation and/or optimization executed in step S908, S918, or S924 in the flow chart in FIG. 9, and FIG. 10 is a flow chart showing that processing.

The first to fourth embodiments use user's events (deletion, power ON/OFF events) upon starting re-allocation or optimization. In the fifth embodiment, even when the execution timing of re-allocation or optimization has been reached, the re-allocation or optimization is continued only when a predetermined condition is met. The access efficiency to the target image file is determined by the degree of randomness (or discontinuity) of areas where that file is recorded. In the other words, if the degree of randomness (or discontinuity) of areas is low, necessity of re-allocation or optimization is low. Hence, the predetermined condition that determines whether or not re-allocation or optimization is to be continued is represented by the degree of randomness (or discontinuity) of blocks that form the image file. More specifically, only storage areas of an image file which include discontinuous areas relatively separated by a predetermined distance or more are optimized, thus saving the time required for re-allocation and/or optimization.

Figure 10:
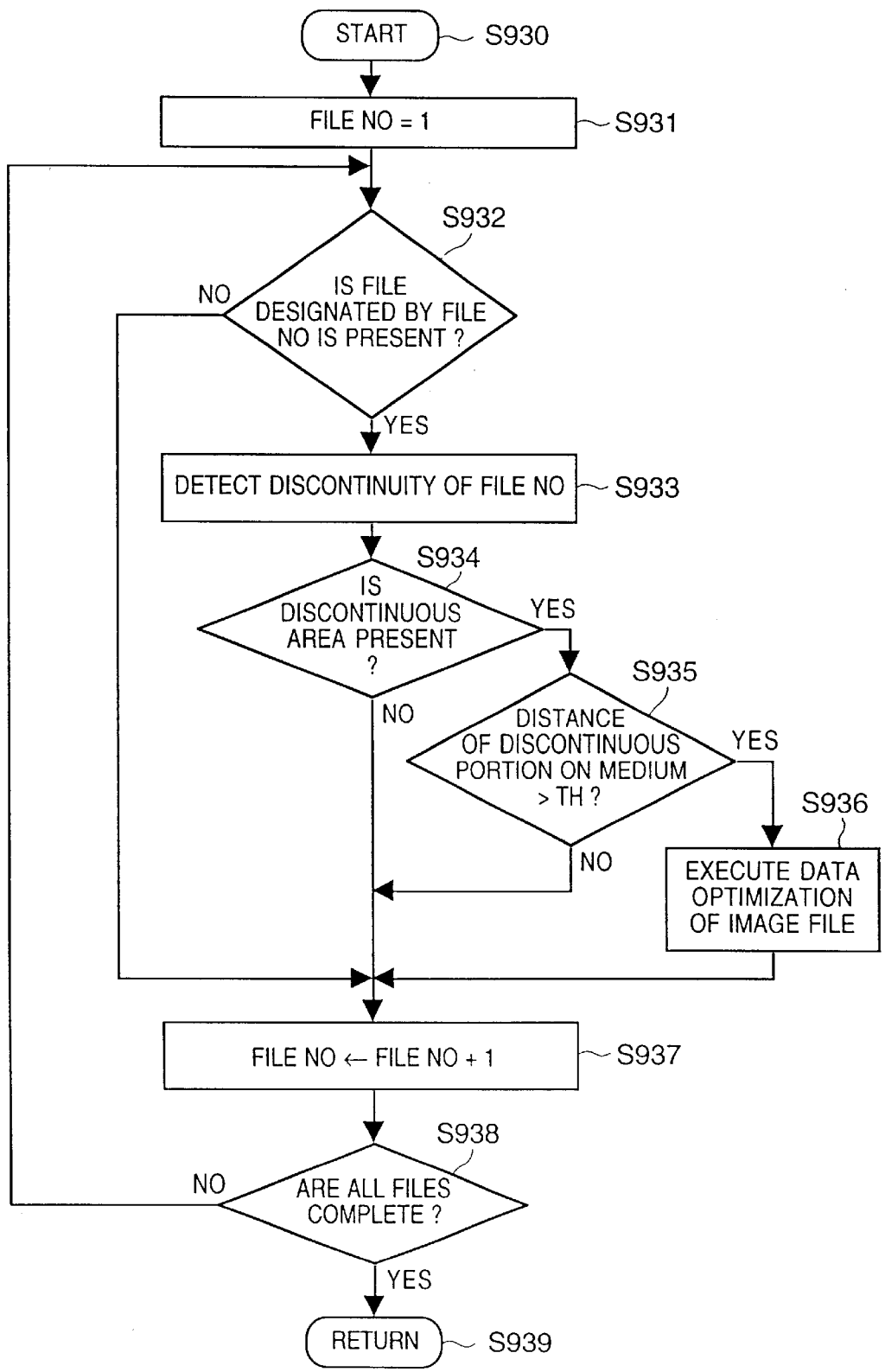
FIG. 10 is a flow chart showing the control sequence of the recording apparatus according to the fifth embodiment of the present invention.

In FIG. 10, when the processing starts in step S930, a variable NO indicating a recorded image file is set at "1" in step S931, and the flow advances to step S932 to check if the file designated by the variable NO is present. If the designated file is not present, the flow jumps to step S937. However, if the designated file is present, the flow advances to step S934 to check if discontinuous areas are present. If no discontinuous areas are present, the flow advances to step S937.

If it is determined in step S934 that discontinuous areas are present, the flow advances to step S935 to check if the value of the relative distance of a discontinuous portion is larger than a predetermined threshold value TH on the recording medium. Only when the relative distance value is larger than the predetermined threshold value TH, the flow advances to step S936 to re-allocate or optimize the image file. After that, the flow advances to step S937.

If it is determined in step S935 that the relative distance of the discontinuous portion is equal to or smaller than the predetermined threshold value TH, the flow advances to step S937 without executing any re-allocation and/or optimization.

In step S937, the variable NO is incremented by 1 to designate the next file, and the flow then advances to step S938 to check if the necessity for re-allocation and/or optimization has been checked for all the files on the recording medium or re-allocation and/or optimization have/ has been done for all the files. If the processing is complete for all the files, the flow advances to step S939 to end this subroutine; if some files remain unprocessed, the flow returns to step S932 to repeat the above-mentioned processing.

An example of the definition of the relative distance of the discontinuous portion in step S935 will be explained below. Assume that one image file X is segmented into n blocks. One block indicates an area consisting of a plurality of continuous sectors. The blocks are assigned block numbers in the recording order upon recording the image file X. If a block with a block number k in the image file X is called a block k, the relative distance of the discontinuous portion is defined by the average value of the track number values of the two neighboring blocks k and k+1. That is, Relative Distance of Discontinuous Portion $$\text{Relative Distance of Discontinuous Portion} = \frac{\sum_{k=1}^{n-1}(TR(k+1) - TR(k))}{n-1}$$

where TR(k) is the track number of block k. Note that n−1 as the denominator of the above equation indicates the number of two neighboring block pairs when there are n blocks.

(Sixth Embodiment)

In the sixth embodiment as well, re-allocation and/or optimization are/is efficiently and divisionally done without disturbing image sensing. In this embodiment, not all files are processed in each re-allocation and/or optimization but a predetermined number of files (three files in this embodiment) are processed per processing.

Figure 11:
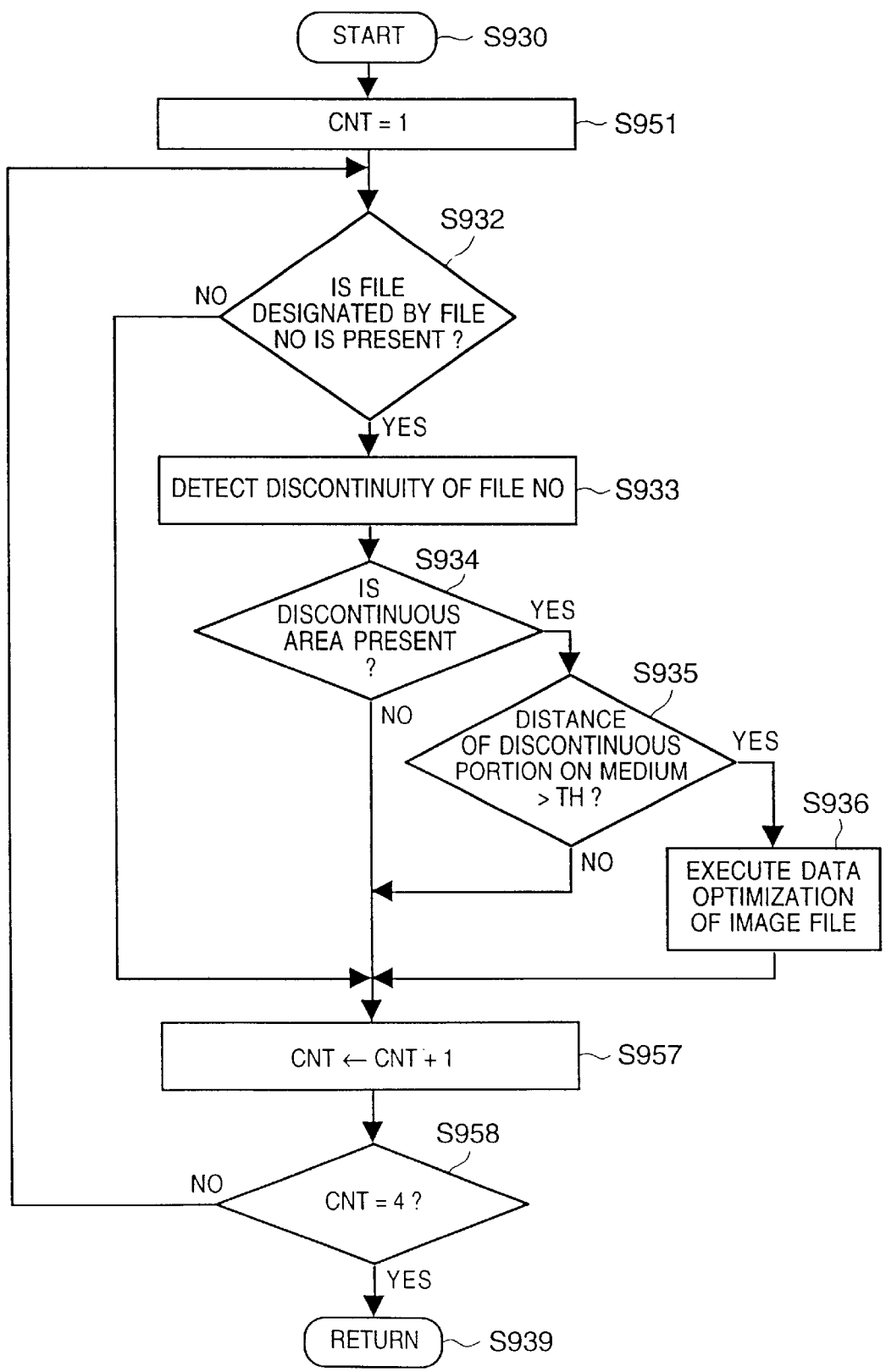
FIG. 11 is a flow chart showing the control sequence of the recording apparatus according to the sixth embodiment of the present invention.

FIG. 11 is a flow chart showing the processing in the sixth embodiment.

The same step numbers in FIG. 11 denote those that perform the same processing operations as those in the fifth embodiment shown in FIG. 10, and a detailed description thereof will be omitted. The flow chart in FIG. 11 is substantially the same as that in FIG. 10, except for steps S951, S957, and S958.

In step S951, "1"is input to a variable CNT that counts the number of files to be re-allocated and/or optimized.

The processing in steps S932 to S936 is the same as that in FIG. 10. In step S957, the variable NO indicating the file number is incremented by 1, and the contents of the variable CNT are also incremented by 1.

Subsequently, if it is determined in step S958 that the number of files to be re-allocated and/or optimized, i.e., the contents of CNT have reached "4", the flow exits the subroutine, and returns to the main routine. By changing the number of files set in step S958, the number of files to be re-allocated and/or optimized per processing can be changed.

(Seventh Embodiment)

The seventh embodiment of the present invention will be described below with reference to FIG. 12. The same reference numerals in FIG. 12 denote the same parts as those in the fifth embodiment shown in FIG. 8, and a detailed description thereof will be omitted.

Figure 12:
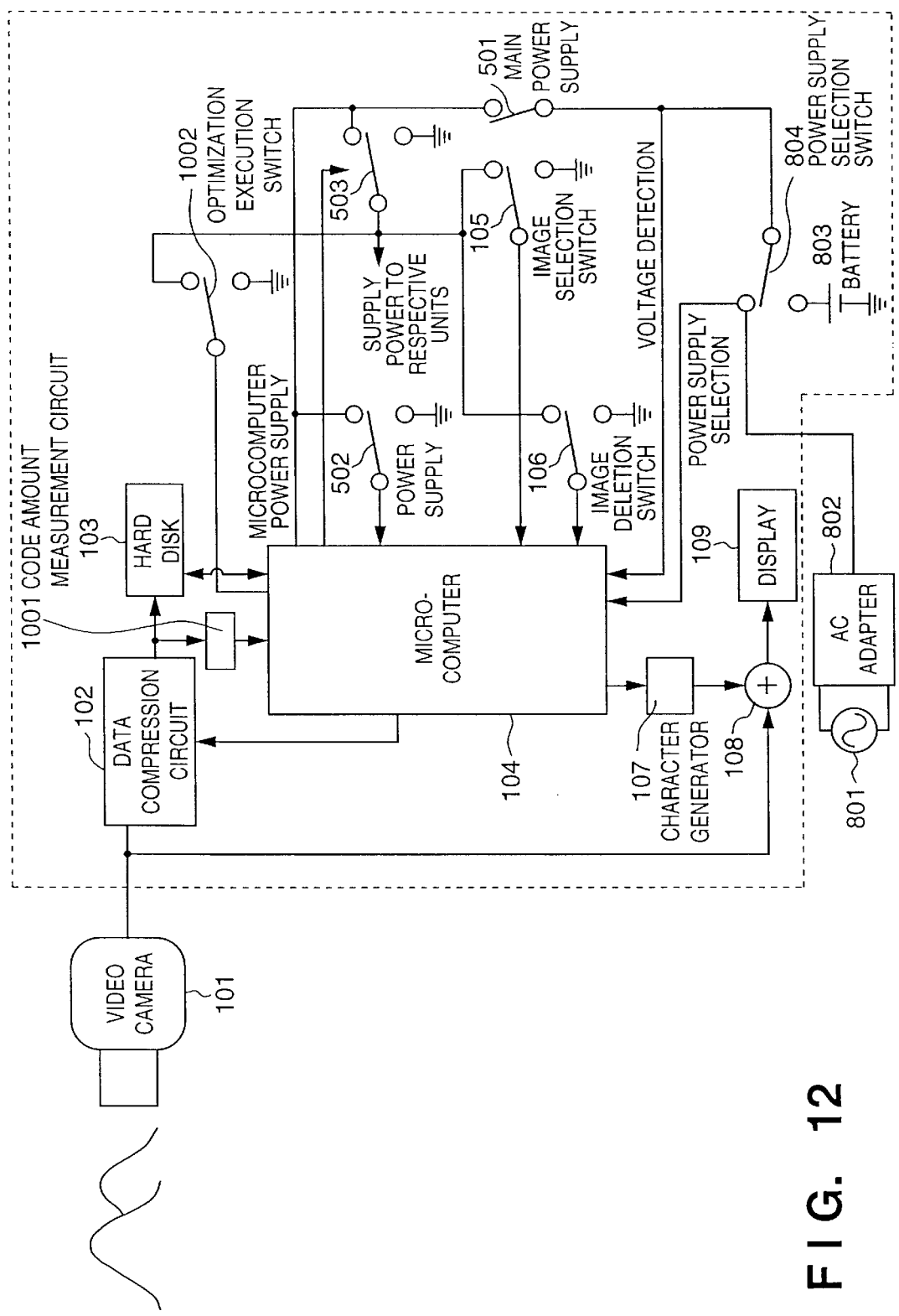
FIG. 12 is a block diagram showing the arrangement of a recording apparatus according to the seventh embodiment of the present invention.

The arrangement in FIG. 12 differs from that in FIG. 8 in that a code amount measurement circuit 1001 is inserted at the output side of the data compression circuit 102 to supply its measurement result to the microcomputer 104, and an optimization execution switch 1002 is arranged to execute re-allocation and/or optimization at operator's will. More specifically, the apparatus checks in place of the user whether or not re-allocation and/or optimization are to be done, and the user finally decides it based on the checking result. When the microcomputer 104 detects that the user has pressed the switch 1002, it determines that the user has finally decided the start of re-allocation and/or optimization.

The remaining capacity of vacant areas on the hard disk is always managed by the microcomputer 104. More specifically, the code amount measurement circuit 1001 informs the microcomputer 104 of the number of code words output from the data compression circuit 102. The microcomputer 104 calculates the remaining capacity on the hard disk 103 on the basis of the accumulated value of the numbers of words. The microcomputer 104 then computes the time when the vacant areas corresponding to the remaining capacity will become full of image data if recording continues at the current recording data rate. In this embodiment, the difference between the current time and the expected disk-full time will be referred to as a remaining recording time hereinafter. The remaining recording time is displayed on the display 109 via the character generator 107, and a warning, message, or the like that prompts the operator to execute re-allocation and/or optimization is displayed in accordance with the remaining time.

Figure 13A:
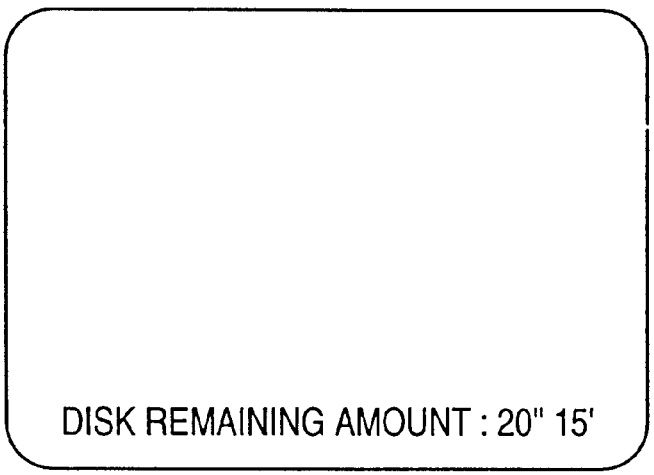
FIGS. 13A and 13B are views for explaining the display operations of the recording apparatus of the seventh embodiment.
Figure 13B:
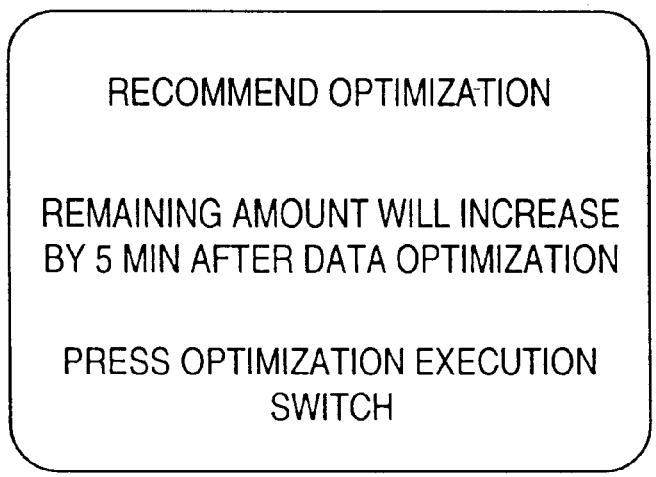

FIGS. 13A and 13B show the screen images that display the disk remaining capacity and a message that prompts to execute optimization.

Figure 14:
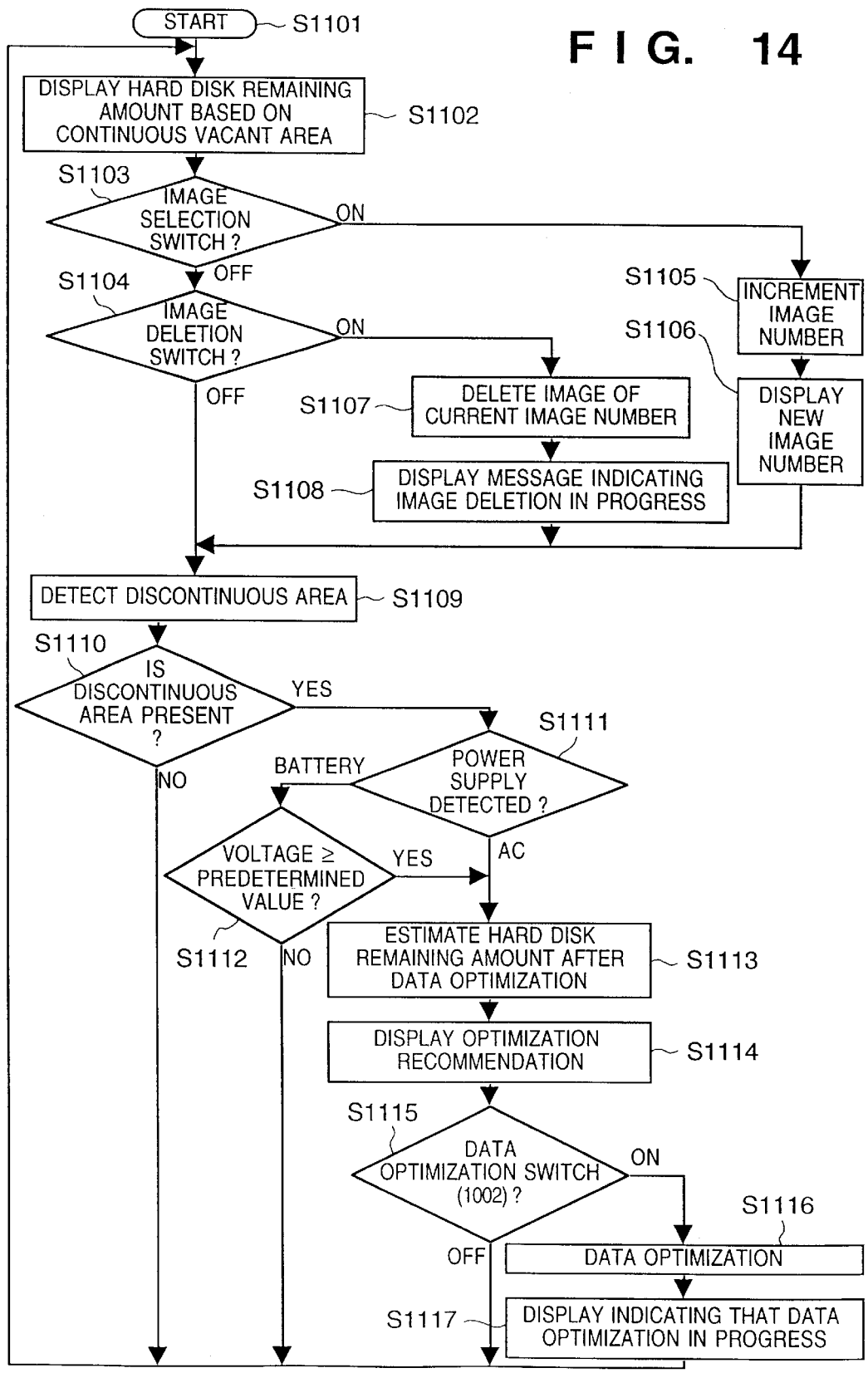
FIG. 14 is a flow chart showing the control sequence of the recording apparatus of the seventh embodiment.

FIG. 14 is a flow chart showing the processing of the seventh embodiment.

When the processing starts in step S1101 in FIG. 14, the hard disk remaining capacity is displayed on the basis of the continuous vacant areas on the hard disk, as shown in FIG. 13A, in step S1102, and the state of the image selection switch 105 is checked in step S1103.

If it is determined in step S1103 that the image selection switch 105 is ON, the number of image information to be selected is incremented by 1 in step S1105, and the new number of image information is displayed in step S1106. The flow then advances to step S1109.

If it is determined in step S1103 that the image selection switch 105 is OFF, the flow advances to step S1104 to check the state of the image deletion switch 106.

If it is determined in step S1104 that the image deletion switch 106 is OFF, the flow advances to step S1109; otherwise, the flow advances to step S1107 to delete image information of the current image number, and a message indicating that deletion of image information is in progress is displayed in step S1108. After that, the flow advances to step S1109.

In step S1109, discontinuous data areas are detected. If it is determined in step S1110 that no discontinuous areas are detected, the flow returns to step S1102; otherwise, the flow advances to step S1111 to detect the power supply state. If the AC power supply is used, and if the battery power supply is used in place of the AC power supply and it is determined in step S1112 that the power supply voltage is equal to or higher than a predetermined value, the flow advances to step S1113 to estimate the remaining capacity of the hard disk obtained upon execution of re-allocation and/or optimization. In step S1114, a message that prompts the user to execute re-allocation and/or optimization is displayed (FIG. 13B).

Subsequently, the state of the optimization execution switch 1002 that the user instructs to execute re-allocation and/or optimization is checked in step S1115. If the switch has been operated, re-allocation and/or optimization are/is executed in step S1116, and a message indicating that the re-allocation and/or optimization are/is in progress is displayed in step S1117. After that, the flow returns to step S1112.

If it is determined in step S1115 that the optimization execution switch 1002 is not operated, or if it is determined in step S1112 that the battery power supply voltage is lower than the predetermined value, the flow returns to step S1102 without executing data optimization.

FIGS. 15A to 15D are views for explaining the operation and remaining amount display of the seventh embodiment.

FIG. 15A shows the state wherein image 1 is recorded using sectors 11 to 16 on the hard disk, image 2 is recorded using sectors 17, 18, and 21, and image 3 is recorded using sectors 22 to 25. Assume that the number of remaining sectors is 27.

In this state, when image 2 is deleted, sectors 17, 18, and 21 become vacant, as shown in FIG. 15B.

When new image 4 is to be recorded in this state, it is not recorded on the vacant areas (i.e., sectors 17, 18, and 21) after deletion of image 2 but is additionally recorded after the last already recorded sector on the hard disk, as shown in FIG. 15C. In FIG. 15C, image 4 is recorded on an area consisting of five sectors 23 to 27.

That is, in the seventh embodiment, new recording is additionally done after the last already recorded sector.

The reason why new image data is recorded after the last already recorded sector is that it is easy to assure continuous areas that way. By contrast, areas from which data has been deleted (e.g., sectors 17, 18, and 21 in FIG. 15B) do not always assure an area length for writing a new image file. More specifically, when new image data is to be written in such deleted areas, if that image data cannot fall within the deleted areas, the data must be partially recorded on another vacant area or areas, and must be sought for, resulting in long access time and poor recording efficiency.

For these reasons, in the seventh embodiment, isolated vacant areas (e.g., sectors 17, 18, and 21 in FIG. 15B) are not considered as vacant areas. Hence, in the example shown in FIG. 15B, even after image 2 has been deleted, the remaining amount does not include such intermediate vacant areas, and remains to be "27 sectors" on the display.

When image 4 is recorded, it is recorded on areas including sectors 23 to 27, as shown in FIG. 15C. After image 4 is recorded, the remaining amount decreases from 27 to 22.

FIG. 15D shows a case wherein vacant sectors are filled with the subsequent data by re-allocation. As a result of re-allocation, image data of images 3 and 4 are shifted to vacant sectors from which image 2 has been deleted (sectors 17, 18, and 21) to fill vacant areas. With this processing, the sector remaining amount increases substantially, and its display also changes from "22 sectors" to "25 sectors".

When vacant sectors are formed in the middle of the already recorded area by deleting some image information, these sectors are not included in the sector remaining amount display, and an increase in the number of vacant sectors is displayed after re-allocation and/or optimization. Hence, a camera which can avoid misleading the operator, and has short access time and high operability and reliability can be provided.

In the seventh embodiment, vacant areas formed by deletion are not marked as actual vacant areas. However, as has been described above with the aid of FIG. 15D, after optimization, all the vacant areas are marked as actual vacant areas.

(Effects of Embodiments)

I: According to the first to seventh embodiments, re-allocation is done, and wasteful vacant areas can be prevented from being formed. For this reason, it is easy to assure continuous vacant areas. Since a new image file is recorded on such continuous areas, the capacity can be avoided from becoming insufficient too often. Also, recording to continuous areas leads to efficient recording itself and reproduction due to a decrease in the number of times of unwanted seek.

II: With optimization of the first to seventh embodiments, since the number of times of unwanted seek can be further decreased, an existing image file can be efficiently accessed especially.

III: In the first to seventh embodiments, re-allocation and optimization are executed in response to deletion of an image file. Since vacant areas are formed upon deletion of a file, deletion is a preferred event that determines the timing of executing re-allocation and optimization. Also, re-allocation and optimization are executed in response to power ON/OFF. The power ON/OFF timing corresponds to one start/end timing of use of the camera. At such start/end timing, since vacant areas have been accumulated by operations done so far, the ON/OFF timing is a preferred event that determines the timing of executing re-allocation and optimization.

IV: In the first to seventh embodiments, a message indicating that the re-allocation and optimization are in progress is displayed to call user's attention.

V: In the fourth to seventh embodiment, even when the execution timing of re-allocation and optimization has been reached, they are not immediately executed before the condition for executing the re-allocation and optimization is met.

V-1: For example, in the fourth embodiment, when the battery voltage is low, since an image file may be lost if re-allocation and optimization are done in such state, the re-allocation and optimization are interrupted. However, when the power supply voltage is supplied from the AC power supply or when the voltage is sufficiently high even if it is supplied from the battery, the re-allocation and optimization are continued since there is no fear of data losses.

V-2: For example, in the fifth embodiment, even when the execution timing of re-allocation and optimization has been reached, not all the image files are processed but files including blocks in a random recording order are preferentially re-allocated or optimized. Once re-allocation and optimization are started, the user cannot use the apparatus until they are complete. In the fifth embodiment, unnecessary re-allocation and optimization can be avoided.

In the sixth embodiment, the number of blocks to be re-allocated and/or optimized is limited to a given value in addition to the function of the fifth embodiment. The sixth embodiment can enhance the function of preventing unnecessary re-allocation and optimization.

VI: In the seventh embodiment, the user is informed of the recommended execution timing of re-allocation and optimization. The re-allocation and optimization are executed only when the user approves them. The user can take the initiative over the machine.

VII: In the seventh embodiment, a new image file is recorded after the last already recorded area on the recording medium. With this recording, continuous areas corresponding to the capacity of the new file to be recorded are likely to be assured. Hence, vacant areas formed after deletion are not considered as actual vacant areas and, consequently, vacant areas are reported to the user without counting those vacant areas formed by deletion, thus preventing the user from misunderstanding.

In the first to seventh embodiments, re-allocation and optimization mean different processes, but re-allocation may include optimization.

In the first to seventh embodiments, re-allocation and optimization are done under the software control of the microcomputer, but may be implemented by discrete circuits. Hence, in this specification, the logic for re-allocation and optimization means both software processing by the microcomputer and hardware logic processing implemented by the discrete circuits.

The present invention is not limited to the above embodiments and various changes and modifications can be made within the spirit and scope of the present invention. Therefore, to apprise the public of the scope of the present invention the following claims are made.

What is claimed is:

1. An image recording apparatus having a recording medium for recording image, comprising:

a power supply unit for driving said image recording apparatus;

a recording unit for recording image data on the recording medium;

a deleting unit for deleting a part or all of the image data recorded on the recording medium; and a control unit for selecting and executing one of a re-allocating operation and an optimizing operation of the image data recorded on said recording medium or both of the re-allocating operation and the optimizing operation of the imaae data recorded on said recording medium according to a recorded state of the image data after a delete operation of said deleting unit is performed, when the delete operation is executed by said deleting unit.

2. The apparatus according to claim 1, wherein said control unit re-allocates the image data by removing a vacant area.

3. The apparatus according to claim 1, wherein said control unit optimizes the image data by moving recording locations of the image data so as to continuously record image data in a single image file on tracks with continuous track numbers.

4. The apparatus according to claim 1, wherein said control unit determines that the re-allocating operation or the optimizing operation is to be done when recorded image data is deleted.

5. The apparatus according to claim 1, wherein said control unit determines that the re-allocating operation or the optimizing operation is to be done when the power supply unit is turned on.

6. The apparatus according to claim 1, wherein said control unit determines that the re-allocating operation or the optimizing operation is to be done when the power supply unit is turned off.

7. The apparatus according to claim 1, further comprising: a display unit for displaying information pertaining to the re-allocating operation and the optimizing operation.

8. The apparatus according to claim 7, wherein the information to be displayed includes information indicating that the re-allocating operation and the optimizing operation is in progress.

9. The apparatus according to claim 7, wherein the information to be displayed includes information indicating an execution timing of the re-allocating operation and the optimizing operation.

10. The apparatus according to claim 1, wherein said control unit has a logic for checking if the re-allocating operation or the optimizing operation is to be started.

11. The apparatus according to claim 10, wherein said logic inhibits an execution of the re-allocating operation and the optimizing operation in the case that said recording apparatus is driven by a battery power supply.

12. The apparatus according to claim 1, wherein said control unit has:
a first logic for checking if re-allocation is to be started; and
a third logic for limiting an amount of image data to be re-allocated.

13. The apparatus according to claim 12, wherein said third logic selects blocks in image data with a high degree of discontinuity as blocks to be re-allocated.

14. The apparatus according to claim 12, wherein said third logic limits the number of image data blocks to be re-allocated to fall within a predetermined value.

15. The apparatus according to claim 1, further comprising:
a checking logic for checking if the re-allocating operation or the optimizing operation is to be done; and
a display logic for displaying a message indicating that the re-allocating operation or the optimizing operation is to be done upon reception of an output from said checking logic,
wherein said control unit executes the re-allocating operation or the optimizing operation when a user permits re-allocation or optimization.

16. The apparatus according to claim 1, wherein said control unit inhibits the execution of the re-allocating operation or the optimizing operation of the image data in the case that a voltage level of said power supply unit has dropped below a predetermined value.

17. An image recording apparatus having a recording medium for recording image, comprising:
power supply means for driving said image recording apparatus;
sequential recording means for sequentially recording new image data on said recording medium;
deleting means for deleting a part or all of the image data recorded on the recording medium; and
control means for selecting and executing one of a re-allocating operation and an optimizing operation of the image data recorded on said recording medium or both of the re-allocating operation and the optimizing operation of the image data recorded on said recording medium according to a recorded state of the image data after a delete operation of said deleting means is performed, when the delete operation is executed by said deleting means.

18. The apparatus according to claim 17, further comprising:
means for marking deleted areas; and
means for marking the deleted areas as vacant areas after re-allocation is executed.

19. The apparatus according to claim 17, wherein said control means controls the re-allocation and optimization to be executed in the case that said image recording apparatus is driven by an AC power supply.

20. The apparatus according to claim 17, wherein said control means controls the re-allocation and the optimization to be inhibited in the case that said image recording apparatus is driven by a battery power supply.

21. The apparatus according to claim 17, wherein said control means controls the re-allocation and the optimization to be inhibited in the case that said image recording apparatus is driven by a battery power supply and a battery voltage is below a predetermined value.

22. The apparatus according to claim 10, wherein said control means inhibits the execution of the re-allocating operation or the optimizing operation in accordance with the status of said power supply means.

23. A method of controlling recording of image data onto a recording medium, comprising:
a re-allocation step of re-allocating the image data recorded on said recording medium;
an optimization step for optimizing the image data recorded on said recording medium;
a checking step of checking a start condition of the re-allocation or the optimization of the image data;
a deleting step of deleting a part or all of the image data recorded on said recording medium; and
a control step of selecting and executing one of a re-allocating operation of the re-allocation step and an optimizing operation of the optimization step or both of a re-allocating operation of the re-allocation step and an optimizing operation of the optimizing step according to a recorded state of the image data, if it is determined in the checking step that the start condition is satisfied, when a delete operation is executed in said deleting step.

24. The method according to claim 23, wherein it is determined in the checking step that the start condition is satisfied when recorded image data is deleted.

25. The method according to claim 23, wherein it is determined in the checking step that the start condition is satisfied when a power supply is turned on.

26. The method according to claim 23, wherein it is determined in the checking step that the start condition is satisfied when a power supply is turned off.

27. The method according to claim 23, wherein the checking step comprises:
a step of informing a user of an execution timing of the re-allocation and the optimization; and
a step of receiving an execution instruction of the re-allocation and the optimization from the user.

28. The method according to claim 23, wherein said control step has a logic for checking if the re-allocation or the optimization is to be started.

29. The method according to claim 23, wherein the checking step comprises:
   a step of checking if a recording apparatus is driven by a battery power supply and a battery voltage has dropped below a predetermined voltage; and
   wherein the control step controls the re-allocation step and the optimization step to be inhibited on the basis of the checking result.

30. the method according to claim 23, wherein the re-allocation step has a limiting step of limiting an amount of image data to be re-allocated.

31. The method according to claim 30, wherein the limiting step includes a step of selecting blocks in image data with a high degree of discontinuity as blocks to be re-allocated.

32. The method according to claim 30, wherein the limiting step includes a step of limiting the number of image data blocks to be re-allocated to fall within a predetermined value.

33. The method according to claim 23, wherein said control step inhibits the re-allocation and the optimization when a voltage of a power supply for driving a recording apparatus has dropped below a predetermined value.

34. A method of controlling recording of image data onto a recording medium, comprising:
   a sequential recording step of sequentially recording new image data on said recording medium and the sequential recording step includes a step of recording the new image data after an end location of last recorded image data;
   a re-allocating step of re-allocating the image data recorded on said recording medium;
   an optimization step of optimizing the image data recorded on said recording medium; and
   a controlling step, when a part of the image data recorded on sald recording medium is deleted, of selecting and executing one of a re-allocating operation and an optimizing operation of the image data recorded on the recording medium or both of a re-allocating operation of the re-allocation step and an optimizing operation of the optimizing step according to a recorded state of the image data after the part of the image data is deleted.

35. The method according to claim 34, further comprising:
   the step of deleting image data;
   the step of marking deleted areas; and
   the step of marking the deleted areas as vacant areas after re-allocation is executed.

36. A computer readable recording medium, which records a program for executing the following steps:
   a sequential recording step of sequentially recording new image data on the recording medium and the sequential recording step includes a step of recording the new image data after an end location of last recorded image data;
   a re-allocation step of re-allocating the image data recorded on said recording medium;
   an optimization step for optimizing the image data recorded on said recording medium; and
   a control step, when a part of the image data recorded on said recording medium is deleted, of selecting and executing one of a re-allocating operation and an optimizing operation of the image data recorded on said recording medium or both of a re-allocating operation of the re-allocation step and an optimizing operation of the optimizina step according to a recorded state of the image data after the part of the image data is deleted.

* * * * *